(12) United States Patent
Park et al.

(10) Patent No.: US 10,684,767 B2
(45) Date of Patent: Jun. 16, 2020

(54) METHOD OF CONFIGURING MENU SCREEN, USER DEVICE FOR PERFORMING THE METHOD AND COMPUTER-READABLE STORAGE MEDIUM HAVING RECORDED THEREON PROGRAM FOR EXECUTING THE METHOD

(75) Inventors: Chun-eon Park, Gyeonggi-do (KR); Seok-jae Jeong, Gyeonggi-do (KR); Sun-gi Hong, Seoul (KR)

(73) Assignee: Samsung Electronics Co., Ltd (KR)

( * ) Notice: Subject to any disclaimer, the term of this patent is extended or adjusted under 35 U.S.C. 154(b) by 219 days.

(21) Appl. No.: 13/214,758

(22) Filed: Aug. 22, 2011

(65) Prior Publication Data

US 2012/0047463 A1 Feb. 23, 2012

(30) Foreign Application Priority Data

Aug. 20, 2010 (KR) ........................ 10-2010-0080888

(51) Int. Cl.
| | | |
|---|---|---|
| *G06F 3/00* | (2006.01) | |
| *G06F 3/048* | (2013.01) | |
| *G06F 17/00* | (2019.01) | |
| *G06F 3/0488* | (2013.01) | |
| *G06F 3/0482* | (2013.01) | |
| *G09G 5/14* | (2006.01) | |

(52) U.S. Cl.
CPC .......... *G06F 3/0488* (2013.01); *G06F 3/0482* (2013.01); *G09G 5/14* (2013.01); *G09G 2320/0686* (2013.01); *G09G 2340/045* (2013.01)

(58) Field of Classification Search
CPC . G06F 3/0481; G06F 3/04817; G06F 3/04883
USPC .................................. 715/762, 810; 345/173
See application file for complete search history.

(56) References Cited

U.S. PATENT DOCUMENTS

| | | | | |
|---|---|---|---|---|
| 4,901,221 A | * | 2/1990 | Kodosky et al. ............. | 715/771 |
| 5,712,995 A | * | 1/1998 | Cohn ............................ | 715/792 |
| 5,784,275 A | * | 7/1998 | Sojoodi et al. ................ | 700/86 |
| 5,977,973 A | * | 11/1999 | Sobeski et al. ............... | 715/798 |
| 6,469,719 B1 | | 10/2002 | Kino et al. | |
| 8,365,099 B2 | * | 1/2013 | Cho ..................... | G06F 3/0483 |
| | | | | 455/95 |

(Continued)

FOREIGN PATENT DOCUMENTS

| | | |
|---|---|---|
| CN | 101452366 | 6/2009 |
| CN | 101667098 | 3/2010 |

(Continued)

OTHER PUBLICATIONS

Japanese Office Action dated Jul. 6, 2015 issued in counterpart application No. 2013-524797, 4 pages.

(Continued)

*Primary Examiner* — Jordany Nunez
(74) *Attorney, Agent, or Firm* — The Farrell Law Firm, P.C.

(57) ABSTRACT

A method of configuring a menu screen is provided. The method includes generating at least one area within a display area; and arranging at least one menu item in the generated area, a user device for performing the method, and a computer-readable storage medium having recorded thereon a program for executing the method.

11 Claims, 18 Drawing Sheets

(410) SELET TWO POINTS FROM EMPTY AREA (420) DETERMINE AREA BY USING TWO POINTS THAT CORRESPOND TO VERTEXES OF OPPOSITE ANGLE (430) DETERMINE DESIRED AREA SIZE BY DRAGGING (440) DETERMINE DESIRED AREA SIZE BY DRAGGING

(56) References Cited

U.S. PATENT DOCUMENTS

| | | | |
|---|---|---|---|
| 8,438,495 B1* | 5/2013 | Gilra et al. | 715/781 |
| 2004/0212640 A1* | 10/2004 | Mann et al. | 345/792 |
| 2005/0283734 A1* | 12/2005 | Santoro et al. | 715/765 |
| 2007/0022389 A1* | 1/2007 | Ording | G06F 3/0481 715/790 |
| 2007/0074126 A1* | 3/2007 | Fisher et al. | 715/764 |
| 2007/0157089 A1 | 7/2007 | Van Os et al. | |
| 2008/0129686 A1 | 6/2008 | Han | |
| 2008/0174563 A1 | 7/2008 | Kim | |
| 2008/0184141 A1* | 7/2008 | Selig | 715/762 |
| 2008/0211766 A1* | 9/2008 | Westerman | G06F 3/038 345/156 |
| 2009/0058821 A1* | 3/2009 | Chaudhri | G06F 3/04817 345/173 |
| 2009/0064055 A1* | 3/2009 | Chaudhri et al. | 715/863 |
| 2009/0138827 A1 | 5/2009 | Van Os et al. | |
| 2009/0150775 A1 | 6/2009 | Miyazaki et al. | |
| 2009/0172562 A1 | 7/2009 | Lai | |
| 2010/0070926 A1 | 3/2010 | Abanami et al. | |
| 2010/0088634 A1* | 4/2010 | Tsuruta | G06F 3/0488 715/800 |
| 2010/0088639 A1 | 4/2010 | Yach et al. | |
| 2010/0088641 A1 | 4/2010 | Choi | |
| 2010/0293508 A1 | 11/2010 | Hwang et al. | |
| 2010/0302172 A1* | 12/2010 | Wilairat | 345/173 |
| 2011/0134047 A1* | 6/2011 | Wigdor | G06F 3/04883 345/173 |
| 2011/0265002 A1* | 10/2011 | Hong | G06F 3/04855 715/702 |
| 2012/0036460 A1* | 2/2012 | Cieplinski | G06F 3/0481 715/769 |
| 2015/0242092 A1 | 8/2015 | Van Os et al. | |

FOREIGN PATENT DOCUMENTS

| | | |
|---|---|---|
| EP | 0 996 053 | 4/2000 |
| EP | 2 068 237 | 6/2009 |
| EP | 2 194 451 | 6/2010 |
| EP | 2 194 452 | 6/2010 |
| JP | 2005-321915 | 11/2005 |
| JP | 2008027453 | 2/2008 |
| JP | 2009-080548 | 4/2009 |
| JP | 2009-522666 | 6/2009 |
| JP | 2009-157908 | 7/2009 |
| KR | 1020080083192 | 9/2008 |
| KR | 1020100010302 | 2/2010 |
| KR | 1020100032560 | 3/2010 |
| WO | WO 2007/094894 | 8/2007 |

OTHER PUBLICATIONS

Chinese Office Action dated Mar. 31, 2015 issued in counterpart application No. 201180040286.0.
Oktober, Recommended Android Application Business Utilization Scheme, Japan, Aski, Media Works, Jul. 29, 2010, 4 pages.
Korean Office Action dated Jun. 9, 2016 issued in counterpart application No. 10-2010-0080888, 10 pages.
Japanese Office Action dated Apr. 4, 2016 issued in counterpart application No. 2013-524797, 7 pages.
Chinese Office Action dated Jan. 15, 2016 issued in counterpart application No. 201180040286.0, 20 pages.
European Search Report dated Nov. 18, 2016 issued in counterpart application No. 11818423.3-1507, 10 pages.
European Search Report dated Mar. 3, 2020 issued in counterpart application No. 11818423.-1216, 5 pages.

* cited by examiner

FIG. 4
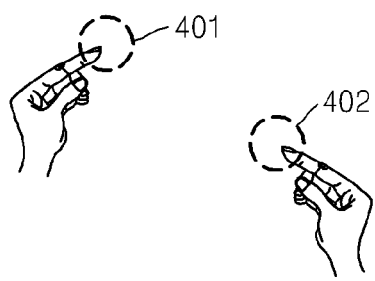
(410) SELECT TWO POINTS FROM EMPTY AREA
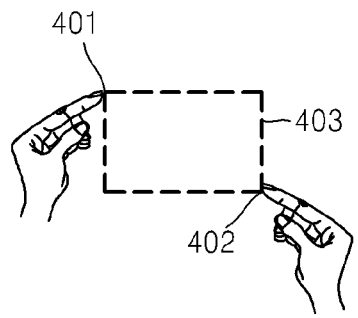
(420) DETERMINE AREA BY USING TWO POINTS THAT CORRESPOND TO VERTEXES OF OPPOSITE ANGLE
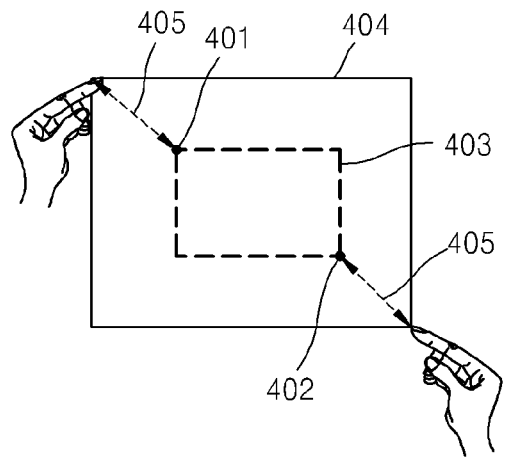
(430) DETERMINE DESIRED AREA SIZE BY DRAGGING
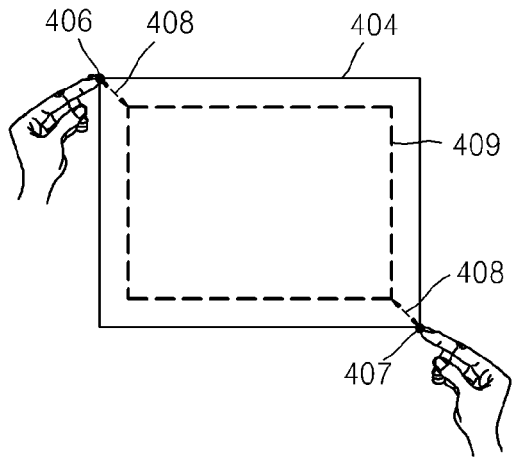
(440) DETERMINE DESIRED AREA SIZE BY DRAGGING FIG. 5
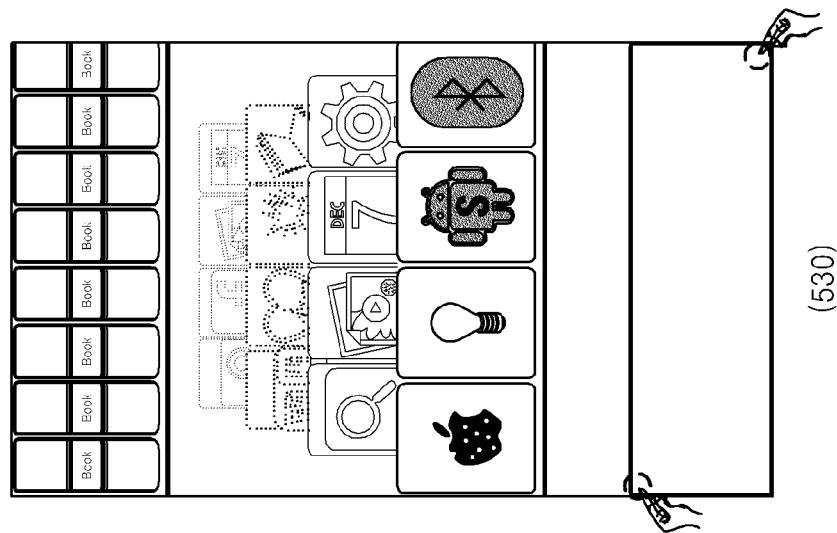
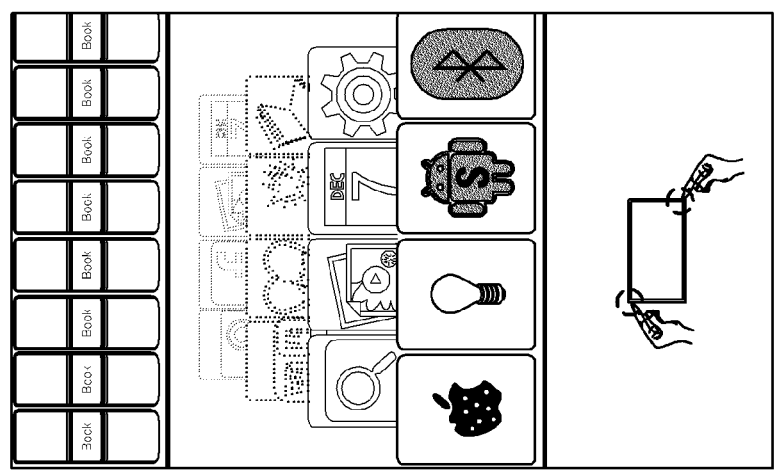
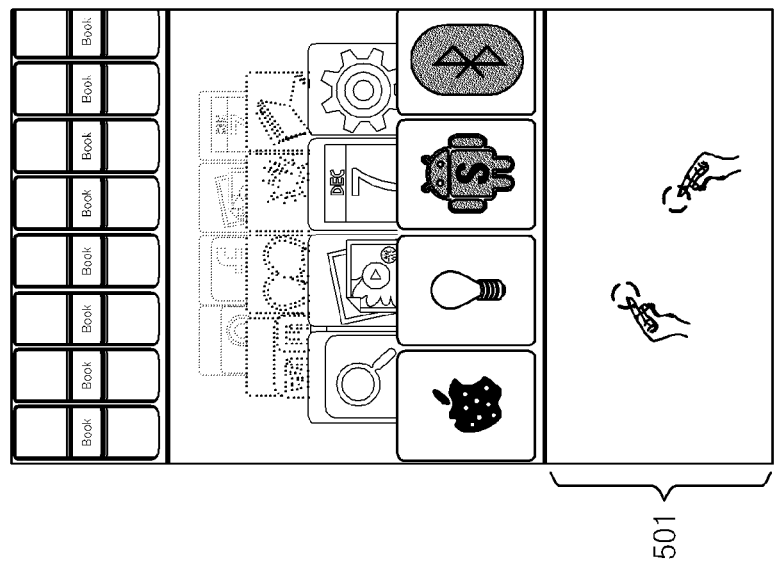

FIG. 12A
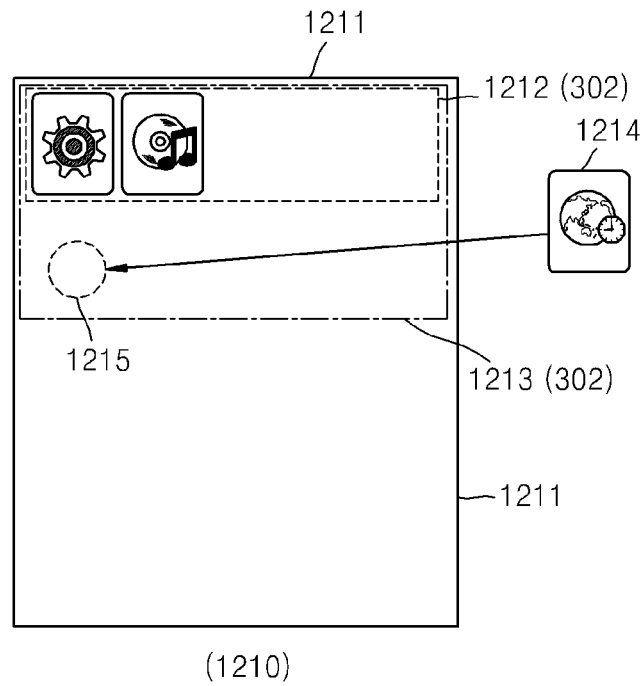
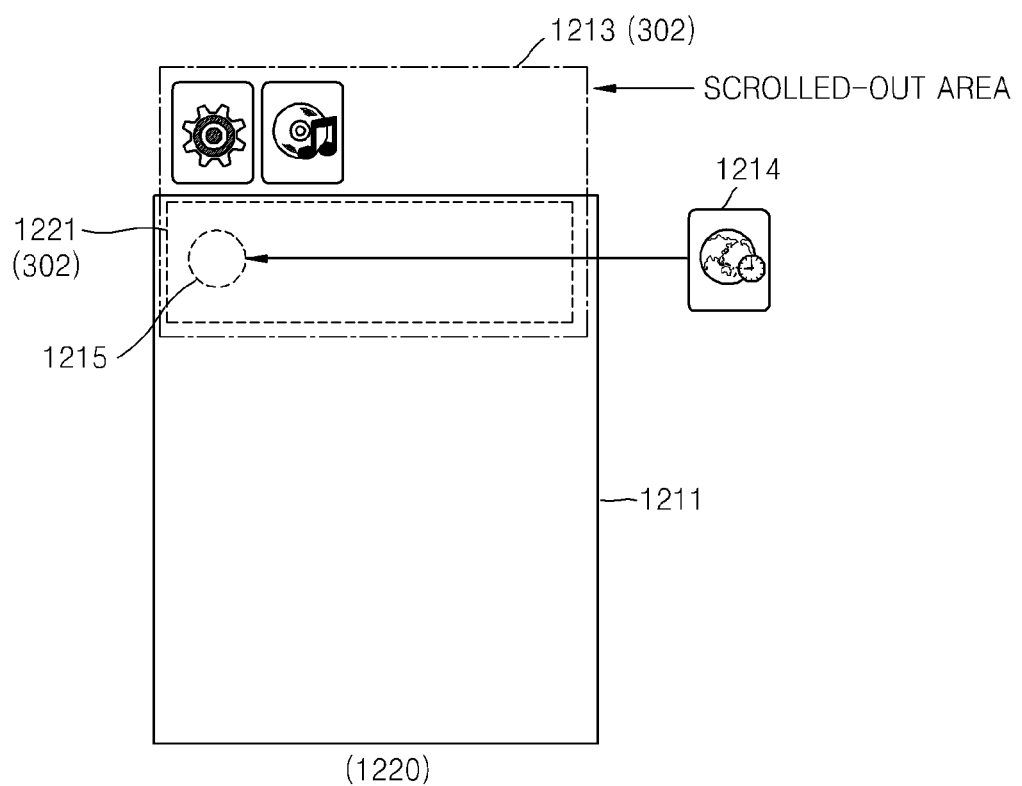

FIG. 12B
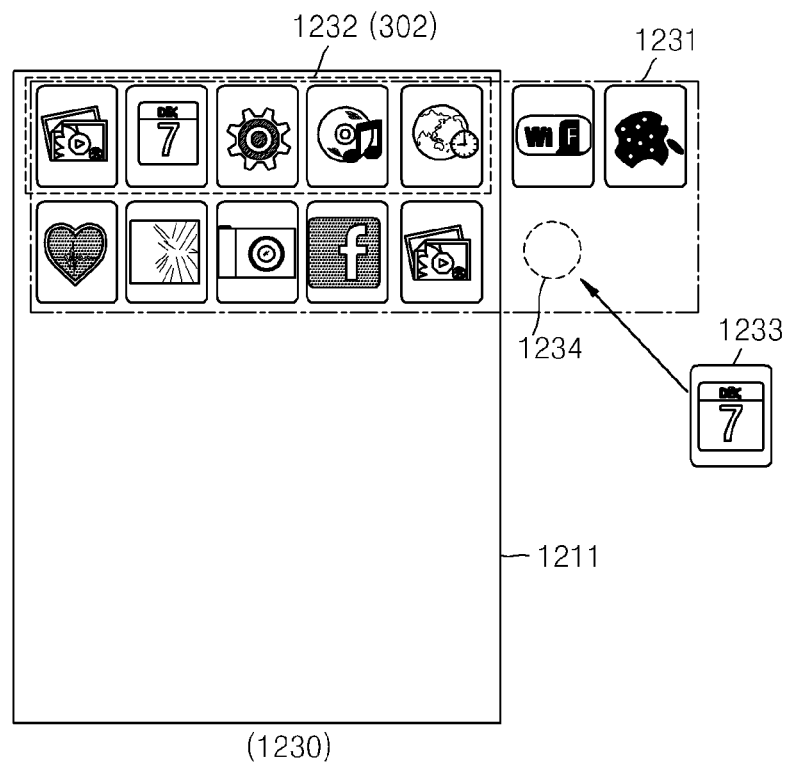
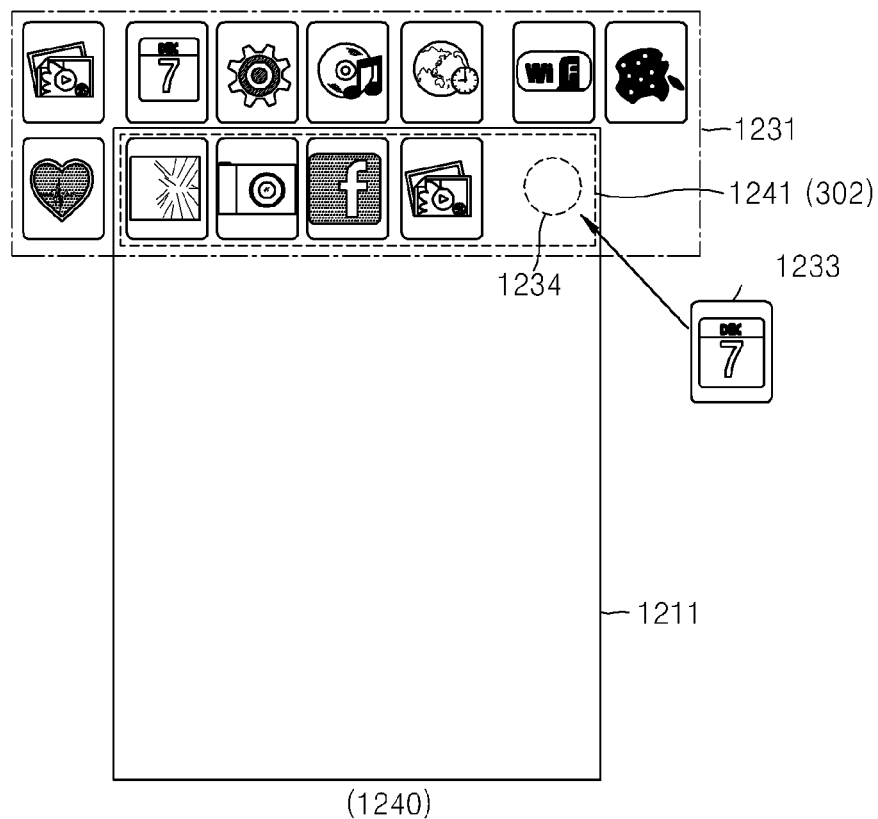

FIG. 15
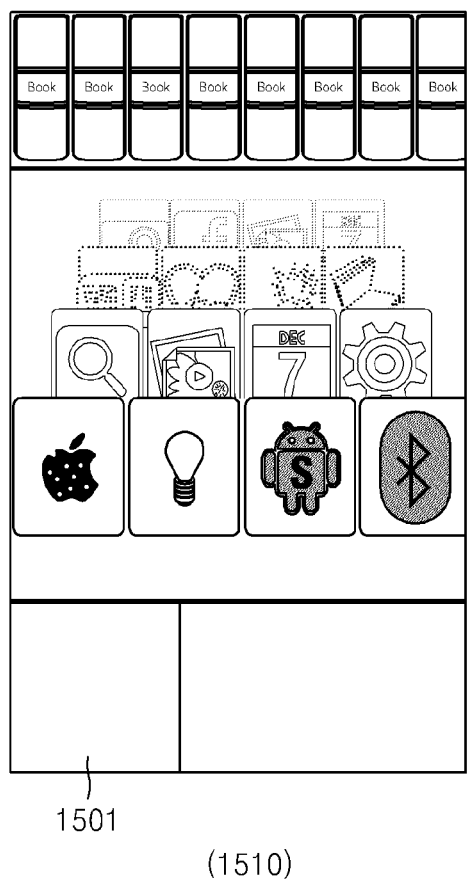
(1510)
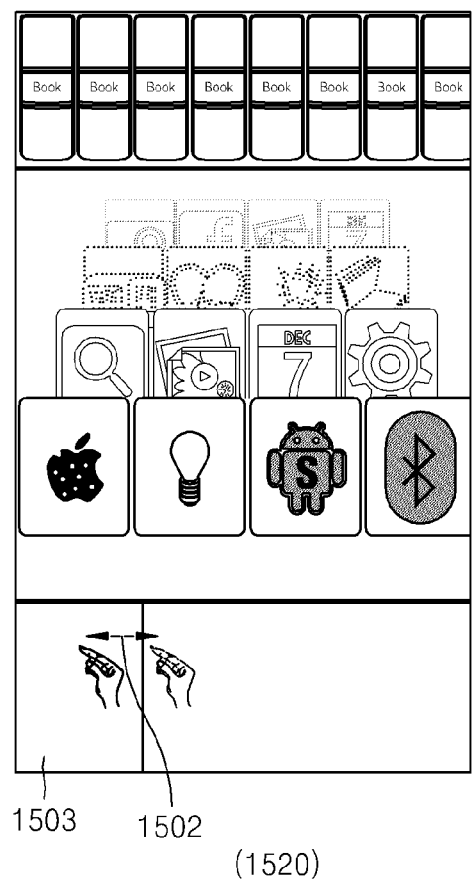
(1520)

METHOD OF CONFIGURING MENU SCREEN, USER DEVICE FOR PERFORMING THE METHOD AND COMPUTER-READABLE STORAGE MEDIUM HAVING RECORDED THEREON PROGRAM FOR EXECUTING THE METHOD

PRIORITY

This application claims priority to a Korean Patent Application filed with the Korean Industrial Property Office on Aug. 20, 2010 and assigned Serial No. 10-2010-0080888, the entire content of which is incorporated herein by reference.

BACKGROUND OF THE INVENTION

1. Field of the Invention

The present invention relates generally to a menu screen, and more particularly, to a method of configuring a menu screen, a user device capable of performing the method, and a computer-readable storage medium having recorded thereon a program for executing the method.

2. Description of the Related Art

As various types of application programs are installed and executed by user devices in which an Operating System (OS) for a mobile device is installed, various technologies for configuring a menu screen on which a user can conveniently execute an application program, have been suggested. However, the menu screens in current operating systems are limited, and there exists a need for new methods and devices for configuring a menu screen.

SUMMARY OF THE INVENTION

Accordingly, an object of the present invention is to provide a method of configuring a user's definition-based menu screen, a user device capable of performing the method, and a computer-readable storage medium having recorded thereon a program for executing the method.

Another object of the present invention also is to provide a method of configuring a user's preference-based menu screen, a user device capable of performing the method, and a computer-readable storage medium having recorded thereon a program for executing the method.

According to an aspect of the present invention, there is provided a method of configuring a menu screen. The method includes generating at least one area within a display area of a device; and arranging at least one menu item in the at least one generated area.

According to another aspect of the present invention, a user device is provided. The user device includes a user interface unit for displaying a menu screen; a storage unit for storing a program and data required to configure the menu screen, and menu screen-configuring information; and a processor for generating at least one area within a display area of the user interface unit and for storing the menu screen-configuring information, such that the menu screen-configuring information indicates that at least one menu item is arranged in the at least one generated area, in the storage unit.

According to another aspect of the present invention, there is provided a computer-readable storage medium having recorded thereon a program for executing a method. The method includes generating at least one area within a display area of a device; and arranging at least one menu item in the at least one generated area.

BRIEF DESCRIPTION OF THE DRAWINGS

The above and other features and advantages of the present invention will become more apparent by describing in detail exemplary embodiments thereof with reference to the attached drawings in which:

FIG. 4 is a diagram illustrating generation of a new area according to a multi-touch-based input signal, according to an embodiment of the present invention;

FIG. 5 is a diagram illustrating examples of screens corresponding to the operation of FIG. 4;

FIGS. 12A through 12C are diagrams illustrating examples of an operation of determining layers on which menu items are to be arranged, according to another embodiment of the present invention;

FIG. 15 is a diagram illustrating an example of a screen on which a display size of a menu item is designated according to still another embodiment of the present invention;

DETAILED DESCRIPTION OF EMBODIMENTS OF THE PRESENT INVENTION

Embodiments of the present invention are described herein below with reference to the accompanying drawings. In the following description, well-known functions or constructions may not be described since they may obscure the invention in unnecessary detail.

Figure 1:
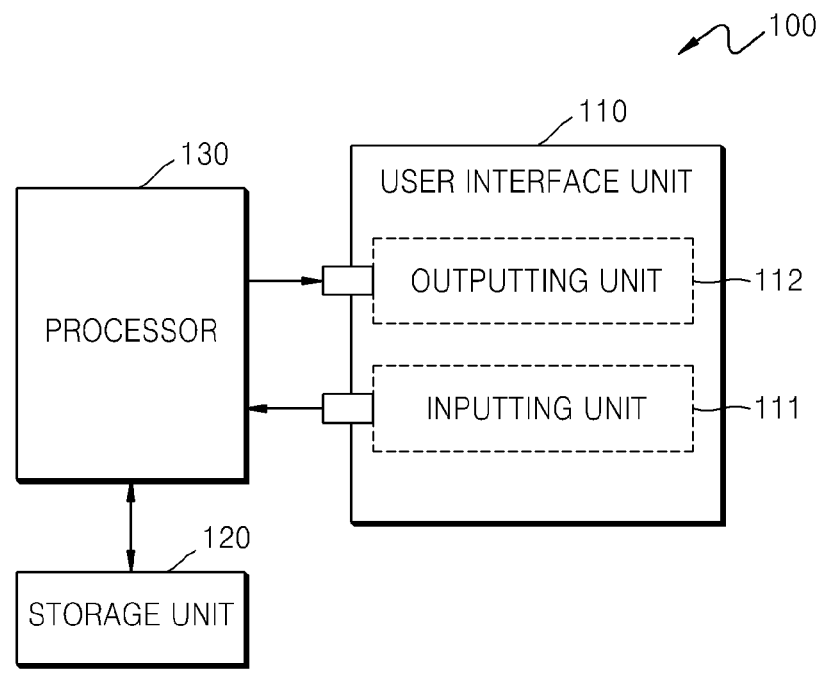
FIG. 1 is a functional block diagram illustrating a user device according to an embodiment of the present invention.

FIG. 1 is a functional block diagram illustrating a user device according to an embodiment of the present invention.

Referring to FIG. 1, a user device 100 may be an embedded device including an installed Operating System (OS) and having a display function; however, the user device 100 is not limited thereto. The user device 100 in accordance with embodiments of the present invention may include a mobile device capable of performing communications, a Personal Digital Assistant (PDA), a digital TeleVision (TV), a navigation device, a Portable Media Player (PMP), a digital camera, a Motion Picture Experts' Group (MPEG) Audio Layer-3 (MP3) player, etc. However, the user device 100 is not limited to these examples, and other such devices may be used in accordance with embodiments of the present invention.

The user device 100 illustrated in FIG. 1 includes a user interface unit 110, a storage unit 120, and a processor 130. However, the user device 100 may further include elements other than the elements shown in FIG. 1.

The user interface unit 110 interacts between the user device 100 and a user. The user interface unit 110 receives an input signal, such as a touch-based signal, a key-based signal, or a mouse manipulation-based signal. The user interface unit 110 outputs guide information and/or a guide screen, which are required to configure a menu screen, as well as the menu screen itself.

The guide information may include information, such as a menu item list, guide information for designating a scroller, etc., that are described in further detail hereinbelow. The guide screen may include a screen for displaying an area (or a new area) generated to include menu items that are described in further detail hereinbelow, a guide screen for designating a scroller, a screen for designating the sizes of menu items, a display area, a screen on which the menu items are moved, and the like. The guide screen for designating a scroller and the guide information for designating a scroller may be different from each other in terms of their expressions, but are used for the same purpose.

Input and output signals of the user interface unit 110 are not limited to the above descriptions, and other input and output signals may be provided in accordance with embodiments of the present invention.

The user interface unit 110 includes an inputting unit 111 and an outputting unit 112. A signal input by the user interface unit 110 is interpreted as a signal input by the inputting unit 111. A signal output from the user interface unit 110 is interpreted as a signal output from the outputting unit 112.

The outputting unit 112 may be as a display device, for example. Such display devices include a Liquid Crystal Display (LCD) device, a Light-Emitting Diode (LED), an Active-Matrix Organic LED (AM OLED), etc. However, the outputting unit 112 is not limited to these display devices, and other such output devices may be used in accordance with embodiments of the present invention.

The user interface unit 110 includes a touch screen. When the user interface unit 110 includes a touch screen, the inputting unit 111 may be a touch inputting unit, and the outputting unit 112 may be a screen outputting unit. In such a case, the inputting unit 111 receives a touch-based signal as input.

The storage unit 120 stores a program and data necessary to configure the menu screen and menu screen-configuring information. The storage unit 120 uses a storage medium, such as a flash memory, for example, but other such storage mediums may be used in accordance with embodiments of the present invention. The storage unit 120 is a storage medium on/from which data may be recorded/reproduced.

The processor 130 is processor, such as a controller, a microprocessor, etc., for controlling all functions of the user device 100. However, the processor 130 is not limited to these processors, and other processors may be used in accordance with embodiments of the present invention. The processor 130 generates at least one area in the display area of the outputting unit 112. One generated area may be a display area for configuring a user-based or user's preference-based menu screen. The processor 130 configures the menu screen by arranging at least one menu item in the generated area according to the signal input by the inputting unit 111 and stores the menu screen-configuring information (or menu screen information) of the generated area in the storage unit 120.

The processor 130 loads a program for executing a method of configuring the menu screen stored in the storage unit 130. The program may be stored in the storage unit 120 when the user device 100 is manufactured, or received from an external device and subsequently stored in the storage unit 120. The program may be received from a server, such as an App Store server (not shown) connected via a network or from an external storage medium according to the function of the user device 100. However, other methods of receiving the program may be used in accordance with embodiments of the present invention. To this end, the user device 100 may further include a network interface unit (not shown) or a connection unit (not shown) or a connection port (not shown) that may be connected to an external storage medium.

Figure 2:
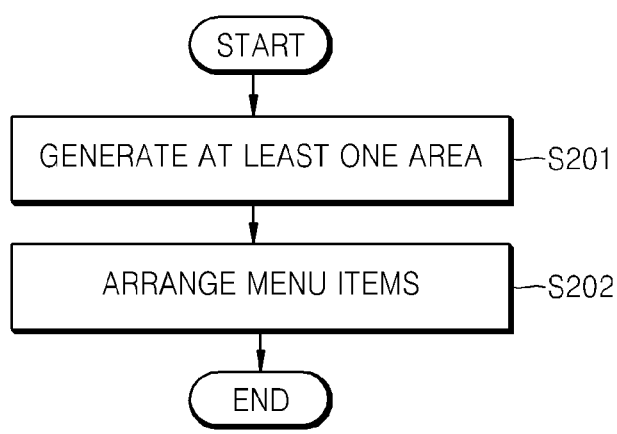
FIG. 2 is a flowchart illustrating a method of configuring a menu screen in a user device, according to an embodiment of the present invention.

The processor 130 may operate, as illustrated in FIG. 2. FIG. 2 is a flowchart illustrating a method of configuring a menu screen in a user device, according to an embodiment of the present invention.

Referring to FIG. 2, in step S201, the processor 130 generates at least one area in the display area of the outputting unit 112. The display area is a full displayable area of the outputting unit 112. The processor 130 generates the at least one area, which may be referred to as a new area, in an empty area of the display area of the outputting unit 112 (i.e., an area in which no data or graphic objects are displayed). The size of the empty area may be less than or equal to the size of full displayable area of the outputting unit 112. If no data or graphic objects are displayed in the full displayable area of the outputting unit 112, the empty area may have the same size as the size of the full displayable area of the outputting unit 112. The size of the area generated by the processor 130 may be the same as or smaller than the empty area. A plurality of areas may be generated in the empty area.

Figure 3:
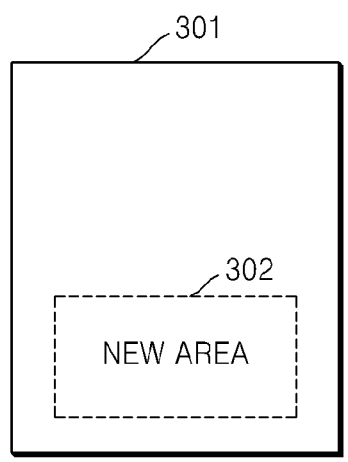
FIG. 3 is diagram illustrating a screen on which a new area is generated in a display area, according to an embodiment of the present invention.

FIG. 3 illustrates a screen on which one area is generated in the empty area of the display area of the outputting unit 112, according to an embodiment of the present invention.

Referring to FIG. 3, a full displayable area 301 of the display area of the outputting unit 112 includes a new area 302 generated in the empty area of the display area of the outputting unit 112. A user-based or user's preference-based menu screen is displayed in the new area 302. The new area 302 may be referred to as a menu screen group. The position of the new area 302 is not limited to a position illustrated in FIG. 3, but may be placed in other positions in accordance with embodiments of the present invention.

The new area 302 may be generated according to a multi-touch-based input signal. FIG. 4 illustrates an operation of generating a new area according to a multi-touch-based input signal, according to an embodiment of the present invention.

Referring to FIG. 4, in step 410, when two points 401 and 402 are touched by fingers in the empty area of the display area 301, the processor 130 receives touch-based input signals corresponding to the two points 401 and 402 from the inputting unit 111.

In step 420, the processor 130 determines an area 403 to be generated according to the touch-based input signal from the two points 401 and 402, and may display a guide screen according to the determined area 403, as illustrated in FIG. 3. In the present example, the determined area 403 corresponds to the new area 302 of FIG. 3. The two points 401 and 402 may be touched simultaneously or at different times, and the touching operation may be performed using fingers, —a stylus pen, etc.

In order to determine the area 403 to be generated, the processor 130 performs an arithmetic operation using position values of two points 401 and 402. In the following formulas, the point 401 is referred to as V1 and the point 402 is referred to as V2, such that the processor 130 compares an x-axis value and a y-axis value between the two touched points 401 and 402, thereby obtaining Vmin and Vmax.

If $V1(x)<V2(x)$, the processor 130 determines that $Vmin(x)=V1(x)$ and $Vmax(x)=V2(x)$. If $V1(x)>V2(x)$, the processor 130 determines that $Vmin(x)=V2(x)$ and $Vmax(x)=V1(x)$. $V1(x)$ is an x-axis value in the point 401, and $V2(x)$ is an x-axis value in the point 402.

If $V1(y)<V2(y)$, the processor 130 determines that $Vmin(y)=V1(y)$ and $Vmax(y)=V2(y)$. If $V1(y)>V2(y)$, the processor 130 determines that $Vmin(y)=V2(y)$ and $Vmax(y)=V1(y)$. $V1(y)$ is a y-axis value in the point 401, and $V2(y)$ is a y-axis value in the point 402. Vmin is a coordinate value (or position value) on a left upper-end of the area 403, and Vmax is a coordinate value (or position value) on a right lower-end of the area 403. The processor 130 determines the area 403 based on the left upper-end coordinate value and the right lower-end coordinate value.

Thus, the processor 130 may store information indicating a position of the area 403 in the storage unit 120 and may manage the information. Alternatively, the processor 130 may store the information indicating the position of the area 403 and graphic information regarding the area 403 in the storage unit 120 and may manage them. The graphic information corresponding to the area 403 may be an object having a graphic effect corresponding to the area 403, a widget, etc.

As shown in step 430, the processor 130 may increase from a display size of the area 403 to a display size of an area 404 according to an input signal received through the inputting unit 111 and indicates a drag 405 toward outer sides of the two points 401 and 402. As shown in step 440, the processor 130 may reduce the display size of the area 404 to a display size of an area 409 according to an input signal received through the inputting unit 111, and indicates a drag 408 toward inner sides of the two points 406 and 407.

The display size of the area 403 and the display size of the area 409 may be the same as or different from each other.

FIG. 5 illustrates examples of screens that correspond to the steps 410, 420, and 430 of FIG. 4. Screen 510 includes two points designated in an empty area 501, according to step 410. Screen 520 includes an area is determined based on the two designated points and corresponds to the step 420. The two points are vertexes of an opposite angle. In screen 530, which corresponds to step 430, a desired size of an area within the screen 530 is determined according to a drag based on the two points of the area determined in 420.

Referring back to FIG. 2, in step S202, if at least one area is generated in the display area of the outputting unit 112, the processor 130 arranges menu items in the generated new area 302. The operation of arranging menu items in the new area 302 may be performed based on a menu item list.

Figure 6:
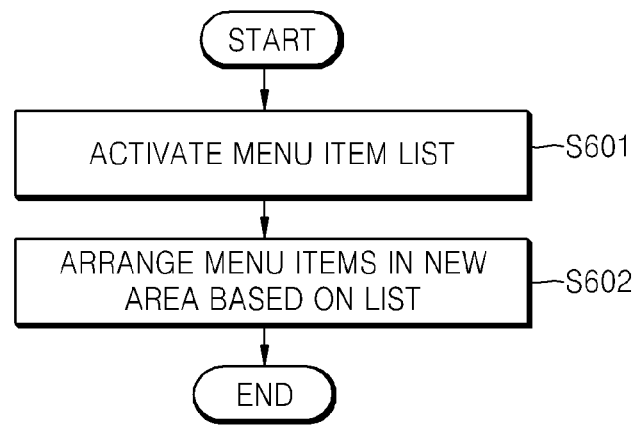
FIG. 6 is a flowchart illustrating an operation of arranging menu items, according to an embodiment of the present invention.

FIG. 6 is a flowchart illustrating an operation of arranging menu items in a new area, according to an embodiment of the present invention.

Figure 7:
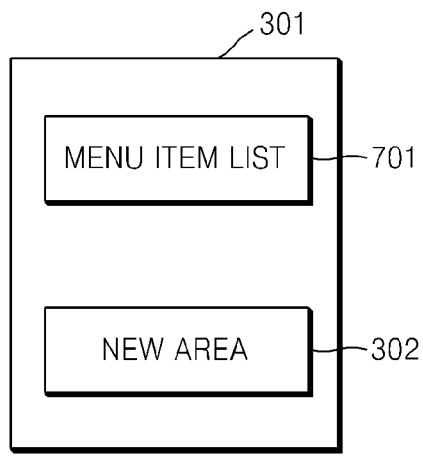
FIG. 7 is a diagram illustrating an example of a screen on which a menu item list is activated, according to an embodiment of the present invention.

Referring to FIG. 6, in step S601, the processor 130 activates the menu item list based on the data stored in the storage unit 120, thus, changing a the screen of FIG. 3 into a screen illustrated in FIG. 7.

FIG. 7 illustrates an example of a screen on which the menu item list is activated in the display area of an outputting unit including the new area.

Referring to FIG. 7, area 701 includes an activated menu item list. The menu item list may be defined as a menu item stand-by list. The menu item list may include menu items corresponding to application programs that have not yet been registered as menu items. However, the menu item list may further include menu items corresponding to application programs that have already been registered as menu items. The menu items are defined as contents for identifying a menu. Thus, the menu items may be expressed as a menu icon or graphic objects defined by a user.

The position of the new area 302 and the position of the menu item list 701 are not limited to those of FIG. 7. For example, display positions of the new area 302 and the menu item list 701 may be reversed. Alternatively, the new area 302 may be displayed in a left vertical area, and the menu item list 701 may be displayed in a right vertical area.

If the menu item list is activated in operation S601 of FIG. 6, the processor 130 arranges the menu items in the new area 302 according to an input signal based on the activated menu item list in operation S602. Arrangement of the menu items based on the menu item list may be performed through a drag input, as illustrated in FIG. 8.

Figure 8:
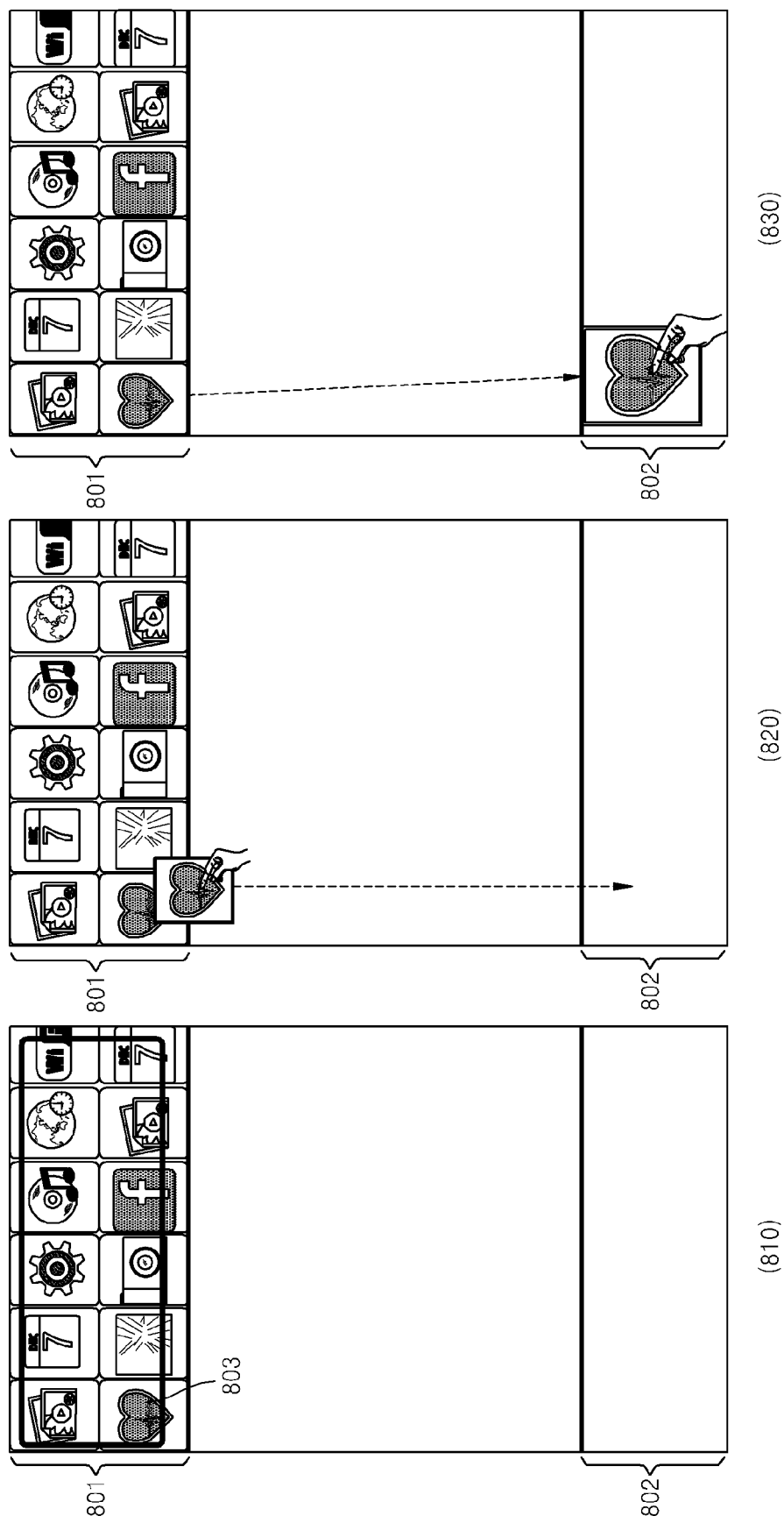
FIG. 8 is a diagram illustrating an example of a screen indicating an operation of arranging menu items based on the menu item list, according to an embodiment of the present invention.

FIG. 8 illustrates an example of a screen indicating an operation of arranging menu items based on the menu item list.

Referring to FIG. 8, a menu item list 801 and a new area 802 are displayed on a display screen 810. If an input signal indicating that a desired menu item 803 in the menu item list 801 is touched, such as illustrated in screen 820, and is dragged toward the new area 802 is received from the inputting unit 111, the processor 130 displays a screen on which a selected menu item is arranged in the new area 802, on the outputting unit 112, such as illustrated in screen 830.

Figure 9:
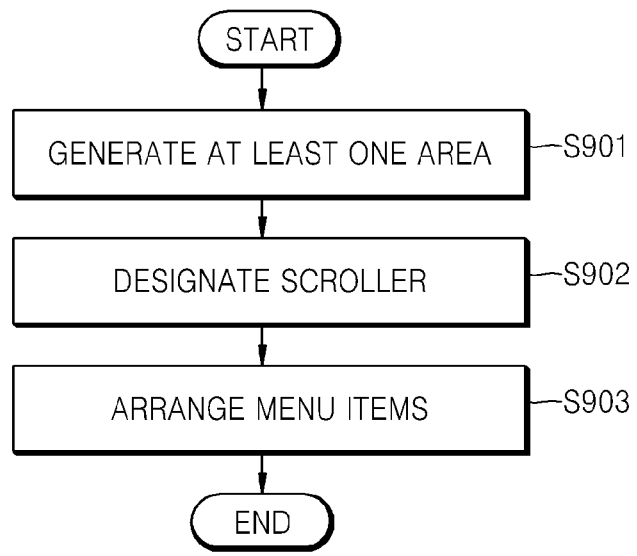
FIG. 9 is a flowchart illustrating a method of configuring a menu screen in a user device, according to another embodiment of the present invention.

The processor 130 may operate, as illustrated in FIG. 9.

FIG. 9 is a flowchart illustrating a method of configuring a menu screen in the user device, according to another embodiment of the present invention.

FIG. 9 illustrates an example of adding a function of designating a scroller to FIG. 2. Thus, operation S901 of FIG. 9 is the same as operation S201 of FIG. 2. In step S902, the processor 130 designates a scroller in which at least one of the x-axis, the y-axis, and the z-axis is supported, in the new area 302 generated based on the signal input by the user interface unit 110.

Figure 10:
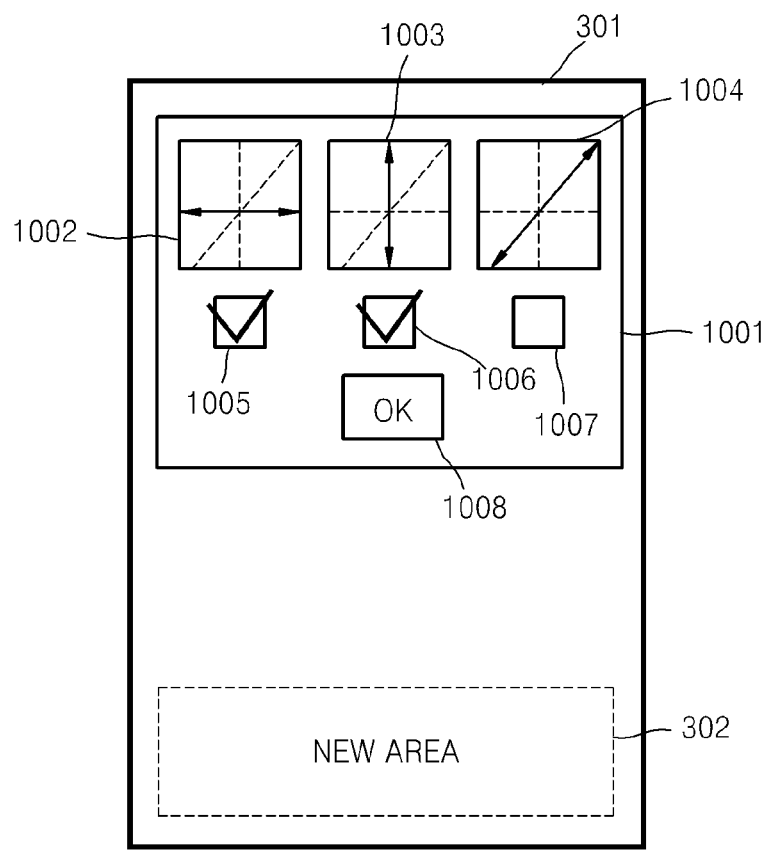
FIG. 10 is a diagram illustrating an example of a guide screen for designating a scroller according to another embodiment of the present invention.

FIG. 10 illustrates an example of a screen on which a guide screen for designating a scroller is output to an outputting unit according to an embodiment of the present invention.

Referring to FIG. 10, the screen includes a guide screen 1001 designates a scroller, an x-axis scroller 1002, a y-axis scroller 1003, and a z-axis scroller 1004. Checkbox 1005 indicates whether the x-axis scroller 1002 is selected, checkbox 1006 indicates whether the y-axis scroller 1003 is selected, and checkbox 1007 indicates whether z-axis scroller 1004 is selected.

FIG. 10 illustrates an example where the user designates the x-axis scroller 1002 and the y-axis scroller 1003. When a signal indicating a touch or click of an OK button 1008, which is a confirmation button, is input in a state where at least one scroller is selected, as illustrated in FIG. 10, the processor 130 designates the at least one scroller in the new area 302. Designation of the scroller in the generated area may be performed based on guide information in a text form output from the outputting unit 112 rather than being based on the guide screen of FIG. 10. Designating of the scroller in the new area 302 is performed based on another method besides the guide screen of FIG. 10 or the above-described guide information.

In operation S903, the processor 130 arranges menu items. In this regard, if in operation S902, scrollers for supporting at least two axes are designated, the processor 130 determines a layer on which the menu items are to be arranged, before arranging the menu items in the new area 302.

Figure 11:
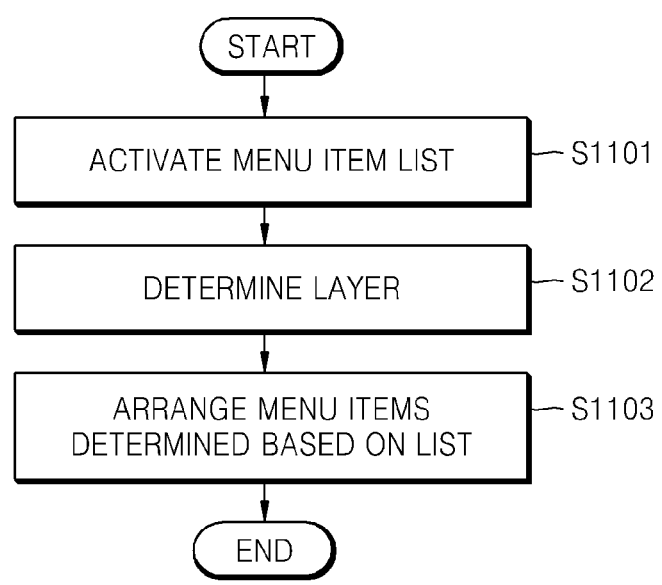
FIG. 11 is a flowchart illustrating an operation of arranging menu items in an area in which a scroller for supporting two or more axes is designated, according to another embodiment of the present invention.

FIG. 11 is a flowchart illustrating arrangement of menu items in a new area in which scrollers for supporting at least two axes is designated, according to another embodiment of the present invention.

Figure 12C:
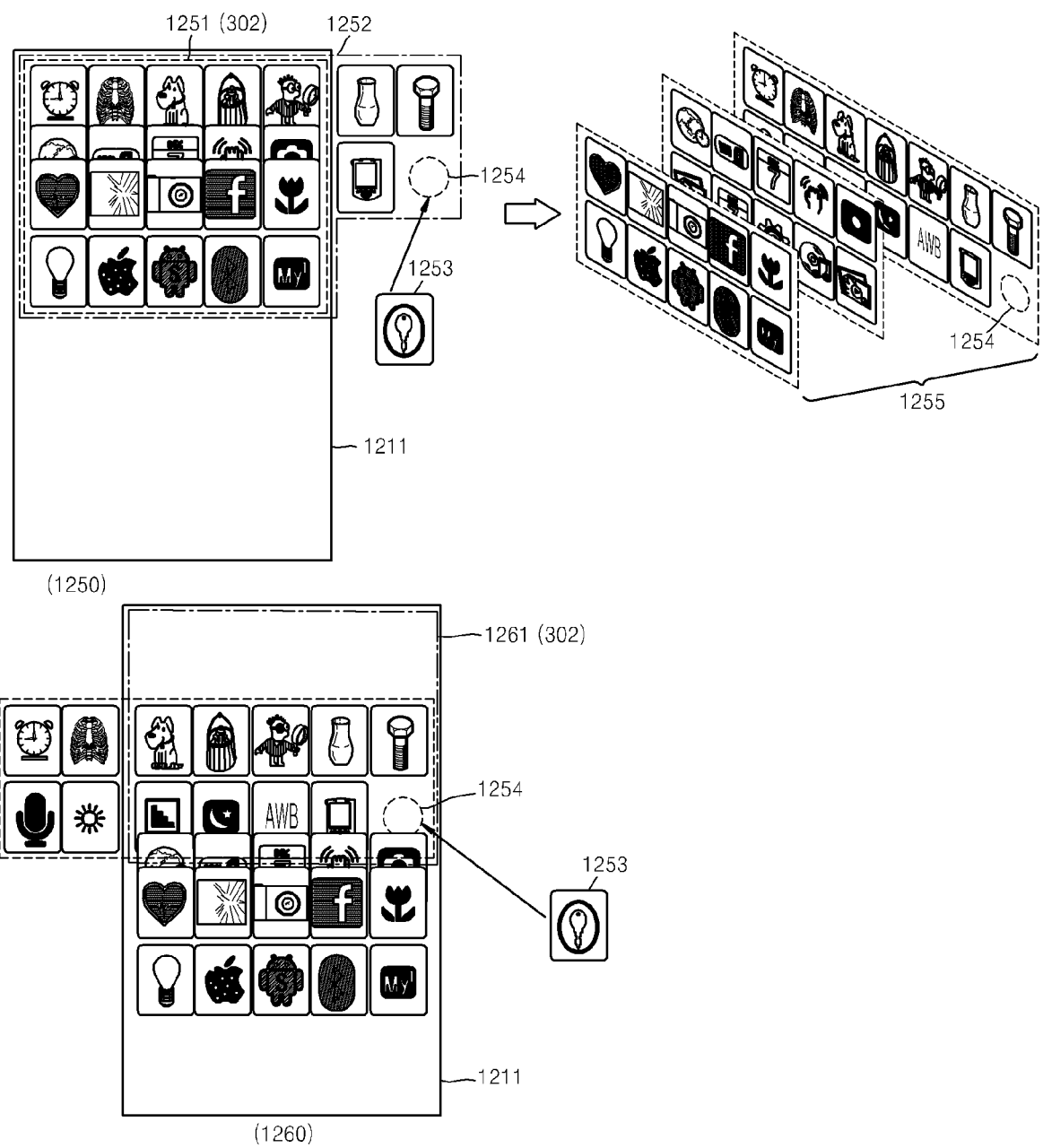

Referring to FIG. 11, in step S1101, the processor 130 activates a menu item list, as in operation S601 of FIG. 6. In step S1102, the processor 130 determines a layer on which menu items are to be arranged. FIGS. 12A through 12C illustrate examples of determining layers on which menu items are to be arranged, according to another embodiment of the present invention.

FIG. 12A illustrates an example of determining a layer on which menu items are to be arranged, when the x-axis and y-axis scrollers are designated in a new area. FIG. 12A illustrates an example where a display area of the outputting unit 112 is 1211, a screen 1212 is displayed on the new area 302 set in the display area 1211 and a scrollable area 1213, and the user wants to add a new menu item 1214 to a point 1215. In FIG. 12A, the user performs scrolling in the y-axis direction in the new area 302 by using the inputting unit 111. Due to the scrolling, the processor 130 determines a layer on which the menu items are to be arranged. The scrollable area may be defined as a scroller space. Thus, a screen displayed on the new area 302 of the outputting unit 112 is controlled by the processor 130 and is changed from the screen 1212 within screen 1210 into a screen 1221 within screen 1220. The screen 1212 is scrolled out of, and therefore is not displayed in the new area 302.

FIG. 12B illustrates another example for determining a layer on which menu items are to be arranged, when the x-axis and y-axis scrollers are designated in the new area 302. Scrollable areas and directions of scrolling for determining a layer on which menu items are to be arranged, of FIGS. 12A and 12B, are different from each other.

In detail, in FIG. 12B includes a scrollable area 1231, and x-axis and y-axis scrolling is performed in the area 302 so as to determine a layer on which menu items are to be arranged. In FIG. 12B includes a screen 1232, on which menu items are arranged, displayed within the new area 302 and includes a scrollable area is 1231. In this example, the user wants to add a new menu item 1233 to a point 1234. Accordingly, the user performs scrolling in the x-axis and y-axis directions in the new area 302 by using the inputting unit 111. Due to the scrolling, the processor 130 determines a layer on which the new menu item 1233 is to be arranged. The scrollable area may be defined as a scroller space. Thus, a screen displayed on the new area 302 of the outputting unit 112 is controlled by the processor 130 and is changed from a screen 1232 within screen 1230 into a screen 1241 within screen 1240. The screen 1232 is scrolled out, and therefore is not displayed in the new area 302.

FIG. 12C illustrates another example of determining a layer on which menu items are to be arranged, when the x-axis, the y-axis, and the z-axis scrollers are designated in a new area.

More specifically, FIG. 12C illustrates a case where a screen on which menu items are arranged, such as a screen 1251, is displayed in the new area 302 set in the display area 1211, 1252 is a scrollable area, and the user wants to add a new menu item 1253 to a point 1254. Referring to FIG. 12C, the user performs scrolling in the x-axis and z-axis directions in the new area 302 by using the inputting unit 111. Due to the scrolling, the processor 130 determines a layer on which the new menu item 1253 is to be arranged. Thus, a screen displayed on the new area 302 of the outputting unit 112 is changed from screen 1251 within screen 1250 into screen 1261 within screen 1260.

The point 1254 is in a seventh column of a second row of a third layer in the z-axis direction, as illustrated in 1255. Due to scrolling in the new area 302, menu items arranged in a point (1,1), a point (2,1), a point (1,2), and a point (2,2) of first, second, and third layers on the z-axis are scrolled out from the new area 302. If the new area 302 is smaller than the area illustrated in FIG. 12C, in FIG. 12C, scrolling may be performed in the x-axis, y-axis, and z-axis directions so that a layer, on which the new menu item 1253 is to be arranged, may be determined.

Upon determining the layer on which menu items are to be arranged, the processor 130 drags a desired menu item, such as illustrated in FIG. 8, based on the menu item list and arranges the menu item on the determined layer in step S1103.

Figure 13:
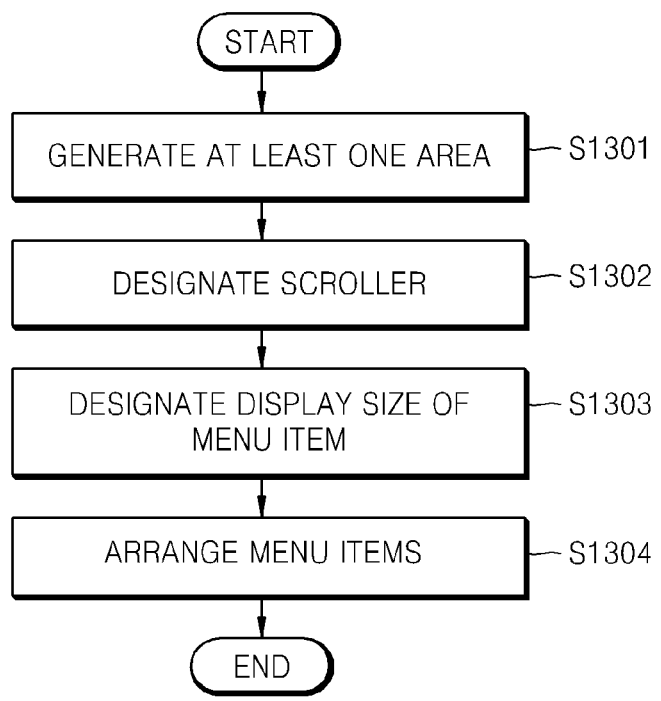
FIG. 13 is a flowchart illustrating a method of configuring a menu screen in a user device, according to still another embodiment of the present invention.

The processor 130 may operate as illustrated in FIG. 13. FIG. 13 is a flowchart illustrating a method of configuring a menu screen in the user device 100, according to still another embodiment of the present invention. More specifically, FIG. 13 illustrates an example for adding a function of designating a display size of a menu item to FIG. 9.

Referring to FIG. 13, steps S1301, S1302, and S1304 are the same as operations S901, S902, and S903 of FIG. 9, respectively, and thus, a further description of is S1301, S1302, and S1304 omitted for clarity and conciseness.

Figure 14:
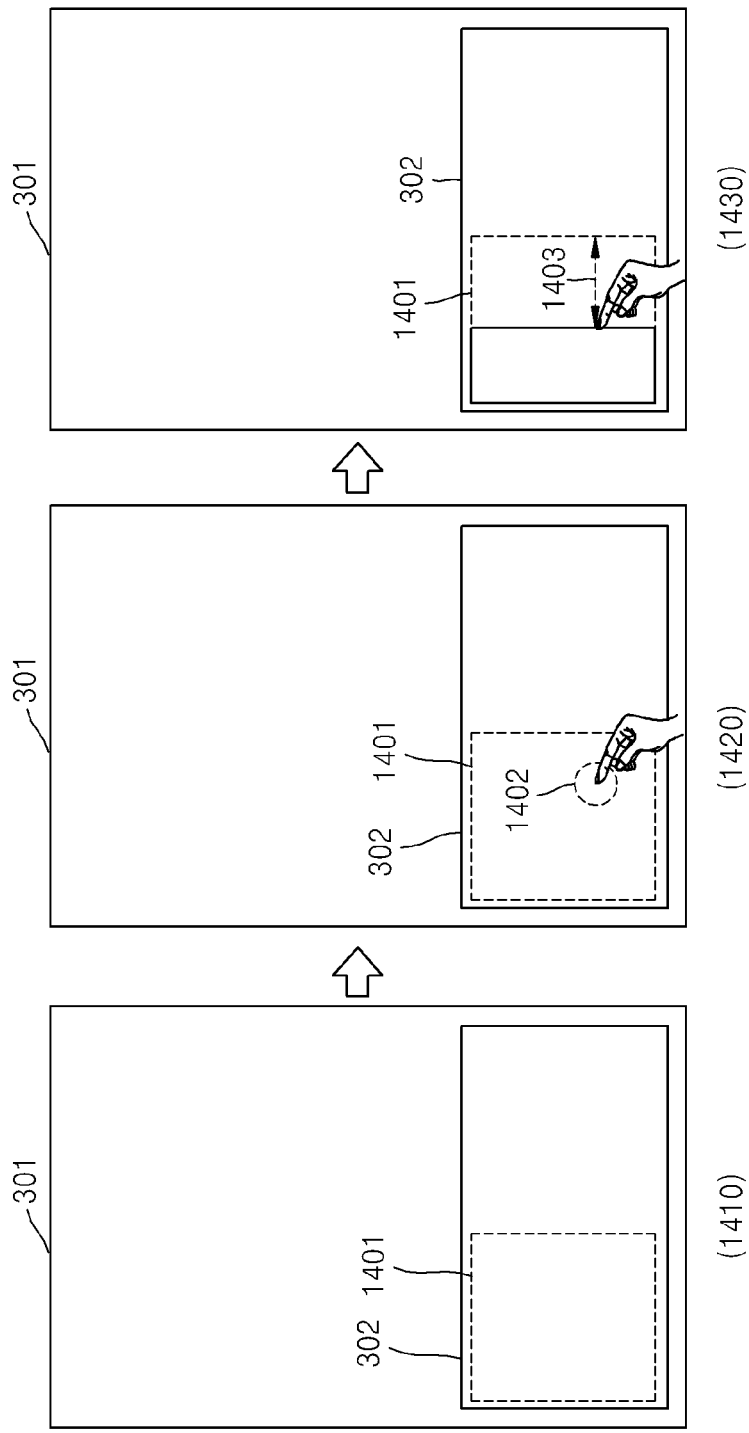
FIG. 14 is a diagram illustrating designation of a display size of a menu item to be arranged in a new area, according to still another embodiment of the present invention.

In step S1303, the processor 130 designates a display size of a menu item to be arranged in the new area 302. FIG. 14 illustrates an example of a screen on which a display size of the menu item to be arranged in a new area is designated. Referring to FIG. 14, if the new area 302 is determined, the processor 130 displays a virtual menu item 1401 in the new area 302, as illustrated in screen 1410.

Thus, when the virtual menu item 1401 is touched by the inputting unit 111 and then is sequentially dragged, as illustrated in screens 1420 and 1430, the processor 130 designates the display size of the virtual menu item 1401 based on a drag distance 1403. Designating of the display size includes adjusting the display size.

FIG. 15 illustrates an example of a screen on which a display size of a menu item is designated, which corresponds to the screen examples illustrated in FIG. 14. Referring to FIG. 15, screen 1510 corresponds to screen 1410 of FIG. 14, and virtual menu item 1501 corresponds to virtual menu item 1401 of FIG. 14. Screen 1520 corresponds to screen 1430 of FIG. 14, and drag 1502 corresponds to drag 1402 of FIG. 14, and item 1503 represents a display size designated in the menu item.

In step S1304, the processor 130 arranges a selected menu item to have the display size designated in step S1303. The menu item arranged in this manner may be touched, and then the display size of the menu item may be re-adjusted by dragging, as illustrated in screens 1420 and 1430 of FIG. 14.

Thus, the method of configuring a menu screen in the user device 100 illustrated in FIG. 13 may be re-implemented by further including adjusting a display size of a menu item arranged, after performing operation S1304. In this regard, a menu item having an adjusted display size less than a predetermined size is deleted from the new area 302. Information about the predetermined size are stored in the storage unit 120 in advance, and when adjusting the display size of the menu item stored in the storage unit 120, the processor 130 may read the information about the predetermined size stored in the storage unit 120.

According to another embodiment of the present invention, the method of FIG. 13 may be altered by deleting step S1302. In such a case, step S1304 may be performed in a manner similar to step S202 of FIG. 2. In addition, the method of FIG. 13 altered by deleting step S1302 and by further including re-adjusting the display size of the menu item described above.

Figure 16:
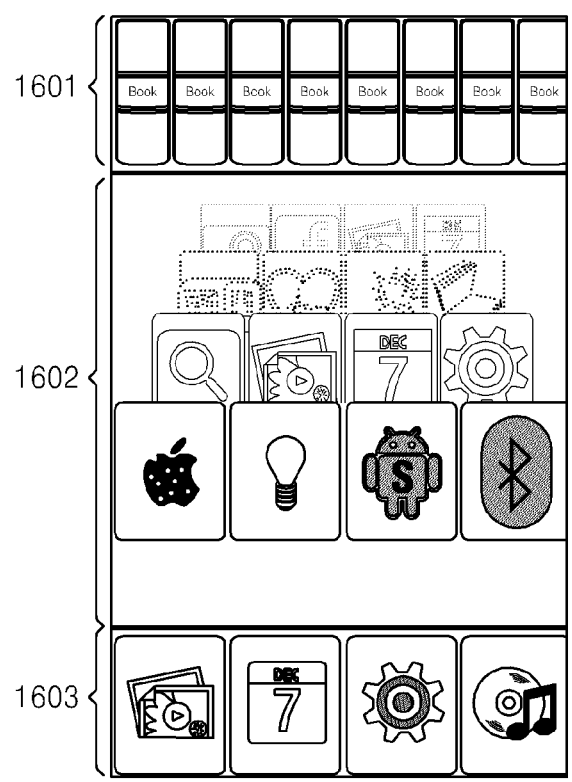
FIG. 16 is a diagram illustrating an example of a screen on which a menu screen is configured, according to still another embodiment of the present invention.

FIG. 16 illustrates an example of a screen on which a menu screen is configured, according to an embodiment of the present invention. More specifically, FIG. 16 illustrates an example of a screen in which three areas 1601, 1602, and 1603 are generated, and menu items are arranged in the generated areas 1601, 1602, and 1603.

Referring to FIG. 16, in the three areas 1601, 1602, and 1603, a scroller may be designated such that at least one of the x-axis, the y-axis, and the z-axis is supported. The area 1602 illustrates an example where menu items are arranged in a three-Dimensional (3D) manner. In the area 1602, when the menu items are arranged, a layer on which the menu items are to be arranged, is determined by performing scrolling in the x-axis, and the z-axis directions, and then arranging the selected menu items on the layer.

Figure 17:
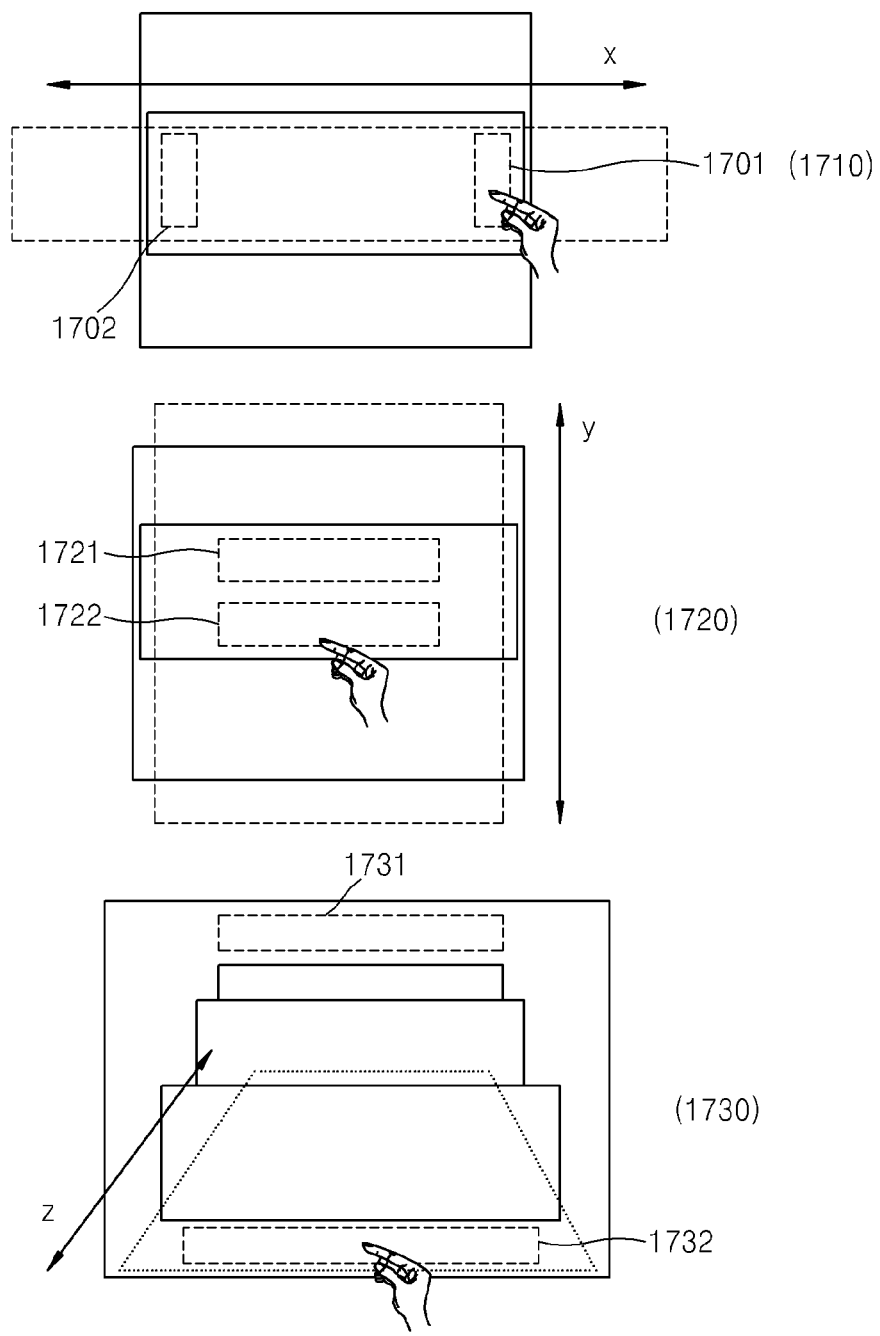
FIG. 17 is a diagram illustrating an example of automatic scrolling according to still another embodiment of the present invention.

FIG. 17 illustrates automatic scrolling according to an embodiment of the present invention.

Referring to FIG. 17, item 1710 is an example of x-axis automatic scrolling. If a single touch on edge portions 1701 and 1702 on the x-axis is maintained for a predetermined amount of time, the processor 130 automatically scrolls the screen of the outputting unit 112 in the x-axis direction. More specifically, if edge portion 1701 is touched by the inputting unit 111 for a predetermined amount of time, the processor 130 automatically scrolls the screen of the outputting unit 112 to the right of the x-axis. If edge portion 1702 is touched by the inputting unit 111 for a predetermined amount of time, the processor 130 automatically scrolls the screen of the outputting unit 112 to the left of the x-axis. The predetermined amount of time is stored in the storage unit 120 in advance and may be read and used by the processor 130.

Item 1720 is an example of y-axis automatic scrolling. If a single touch on edge portions 1721 and 1722 on the y-axis is maintained for a predetermined amount of time, the processor 130 automatically scrolls the screen of the outputting unit 112 in the y-axis direction. More specifically, if edge portion 1721 is touched by the inputting unit 111 for a predetermined amount of time, the processor 130 automatically scrolls the screen of the outputting unit 112 in an upward direction of the y-axis. If edge portion 1722 is touched by the inputting unit 111 for a predetermined amount of time, the processor 130 automatically scrolls the screen of the outputting unit 112 in a downward direction of the y-axis.

Item 1730 illustrates an example of z-axis automatic scrolling. If a single touch on edge portions 1731 and 1732 on the z-axis is maintained for a predetermined amount of time, the processor 130 automatically scrolls the screen of the outputting unit 112 in the z-axis direction. More specifically, if edge portion 1731 is touched by the inputting unit 111 for a predetermined amount of time, the processor 130 automatically scrolls the screen of the outputting unit 112 in an upward direction of the z-axis. If edge portion 1732 is touched by the inputting unit 111 for a predetermined amount of time, the processor 130 automatically scrolls the screen of the outputting unit 112 in a downward direction of the z-axis.

Figure 18:
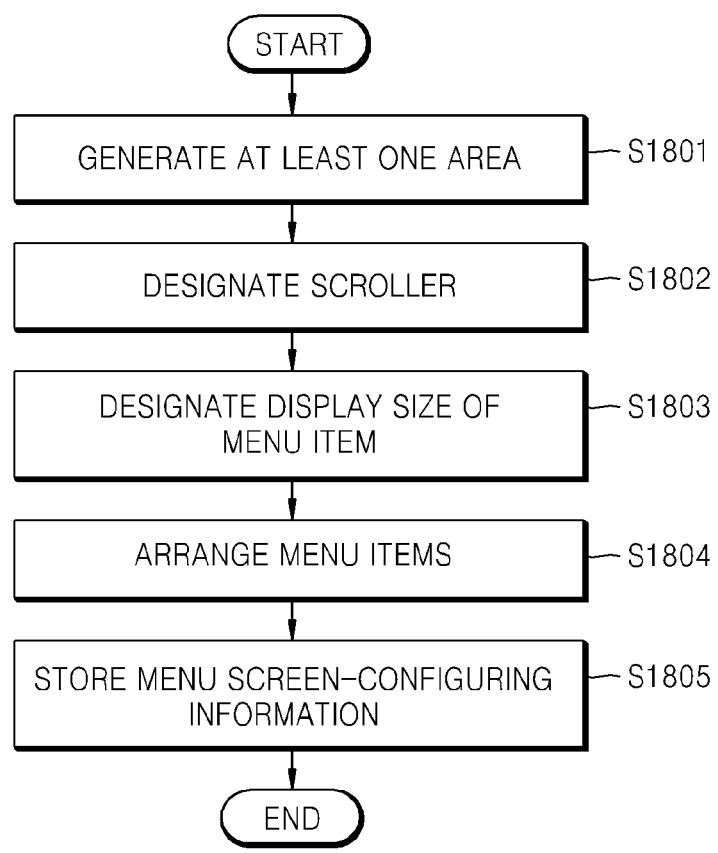
FIG. 18 is a flowchart illustrating a method of configuring a menu screen in a user device, according to still another embodiment of the present invention.

The processor 130 may operate, as illustrated in FIG. 18. FIG. 18 is a flowchart illustrating a method of configuring a menu screen in a user device, according to still another embodiment of the present invention. More specifically, FIG. 18 illustrates an example of adding a function of storing menu screen configuring information to the method of FIG. 13.

Referring to FIG. 18, steps S1801, S1802, S1803, and S1804 of FIG. 18 are the same as steps S1301, S1302, S1303, and S1304 of FIG. 13, respectively, and therefore, further description of these steps is omitted for clarity and conciseness.

In step S1804, menu item arrangement is completed, and the menu screen as illustrated in FIG. 16 is configured on the outputting unit 112. In step S1805, the processor 130 stores the menu screen configuring information being displayed on the outputting unit 112 in the storage unit 120.

According to another embodiment of the present invention, the method of FIG. 18 may be re-implemented by activating a menu item list included in the arranging of the menu items between steps S1802 and S1803 and by omitting the activation of the menu item list in step S1804.

Figure 19:
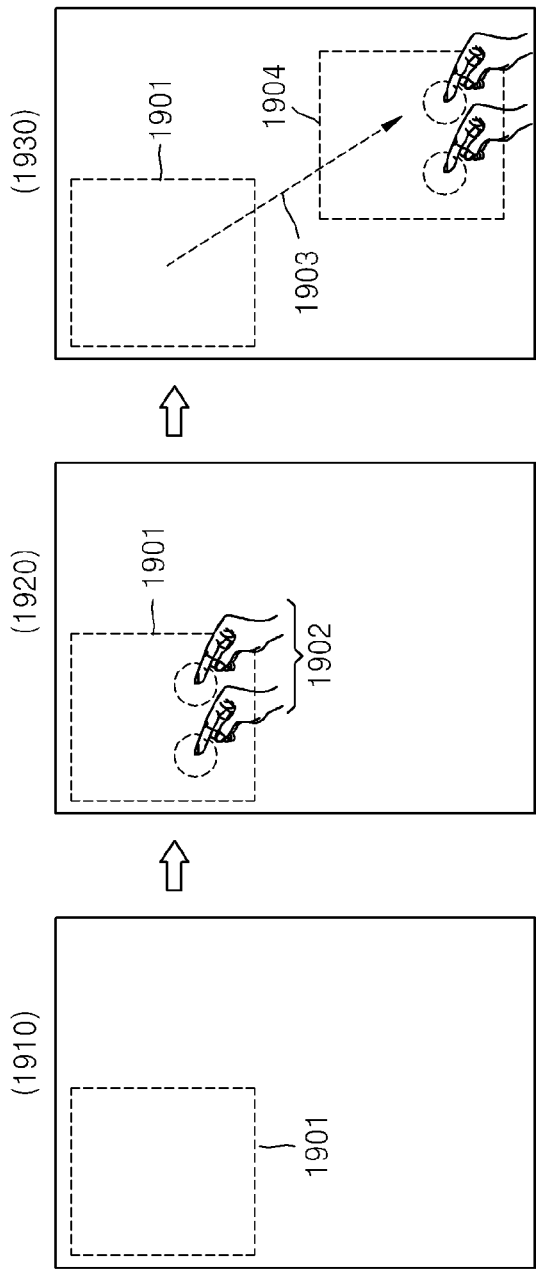
FIG. 19 is a diagram illustrating an example of a screen on which a generated area is moved, according to still another embodiment of the present invention.

The processor 130 may move a display area of the generated area (i.e., a new area) according to a multi-touch input and then drag the generated area. FIG. 19 illustrates such an example of a screen on which a generated area is moved.

Referring to FIG. 19, when an area 1901 generated by the processor 130 is in a position displayed in screen 1910, the processor 130 may move an area being displayed on the outputting unit 112, from the area 1901 to an area 1904, as illustrated in screen 1930, by double-clicking 1902 the generated area 1901 by using the inputting unit 111, as illustrated in screen 1920 and by dragging 1903 the area 1901. The processor 130 may also move a display position of the menu item included in the new area 302 by using such a method. The method for moving the display area of the generated area is not limited to this example, and other such methods may be used in accordance with embodiments of the present invention.

In addition, the processor 130 may designate or adjust the size of the generated area 302 by using the operation of designating the display size of the menu item illustrated in FIGS. 14 and 15. If the size of the generated area 302 is less than a predetermined size, the processor 130 deletes the generated new area 302 from the display area 301 of the outputting unit 112. Even when a menu item is included in the generated new area 302, the generated new area 302 may be deleted. Information about the predetermined size used to delete the generated new area 302 may be stored in the storage unit 120 in advance, and if necessary, the processor 130 reads the information about the predetermined size from the storage unit 120.

A program for executing the method of configuring a menu screen according to embodiments of the present invention can also be embodied as computer-readable codes on a computer-readable recording medium. The computer-readable recording medium may include any data storage device that can store data that can be thereafter read by a computer system. Examples of the computer-readable recording medium include Read-Only Memory (ROM), Random-Access Memory (RAM), CD-ROMs, magnetic tapes, floppy disks, optical data storage devices, etc. The computer-readable recording medium can also be distributed over network coupled computer systems so that the computer-readable code is stored and executed in a distributed fashion.

While this invention has been particularly shown and described with reference to certain embodiments thereof, it will be understood by those of ordinary skill in the art that various changes in form and details may be made therein without departing from the spirit and scope of the invention as defined by the appended claims. The embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method, performed by a device, of configuring a screen, the method comprising:
  receiving, via an input interface of the device, a touch input based on a display of the device;
  determining, by a processor of the device, a display size of an area to be displayed on the display according to the touch input;
  displaying, by the processor, the area on the display based on the determined display size of the area;
  adjusting, by the processor, the display size of the area in response to receiving a touch input based on a boundary line of the area being displayed;
  after adjusting the display size of the area, displaying, on the display, a guide screen for designating a scrolling axis of the area being displayed;
  in response to receiving an input based on the guide screen, designating, by the processor, the scrolling axis including at least one of an x-axis, a y-axis, and a z-axis of the area being displayed;
  after designating the scrolling axis for the area being displayed, displaying, on the display, a list including at least one item;
  determining, by the processor, a part to be displayed on the display among an entire area of all layers corresponding to the designated scrolling axis of the area being displayed by scrolling the entire area based on the designated scrolling axis for the area being displayed;
  in response to receiving an input for selecting and moving an item from among the at least one item based on the displayed list, moving, by the processor, the item into the determined part; and
  storing, into a memory of the device, information regarding the area including the item.

2. The method of claim 1, further comprising, in response to maintaining a touch on at least one edge portion of at least one of the x-axis, the y-axis, and the z-axis of a scroller of the area being displayed for a predetermined amount of time, controlling, by the processor, the scroller -to perform automatic scrolling of the area in a corresponding axis direction and change the part being displayed on the display into another part among the entire area based on the designated scrolling axis.

3. The method of claim 1, further comprising:
  deleting, by the processor, the area being displayed from the display as the display size of the area becomes less than a predetermined size.

4. The method of claim 1, wherein the at least one item includes an icon for identifying an item.

5. A non-transitory computer-readable recording medium having recorded thereon a program for executing a method, performed by a device, of configuring a screen, the method comprising:
  receiving, via an input interface of the device, a touch input based on a display of the device;
  determining, by a processor of the device, a display size of an area to be displayed on the display according to the touch input;
  displaying, by the processor, the area on the display based on the determined display size of the area;
  adjusting, by the processor, the display size of the area in response to receiving a touch input based on a boundary line of the are being displayed;
  after adjusting the display size of the area, displaying, on the display, a guide screen for designating a scrolling axis of the area being displayed;
  in response to receiving an input based on the guide screen,
  designating, by the processor, the scrolling axis including at least one of an x-axis, a y-axis, and a z-axis of the area being displayed;
  after designating the scrolling axis for the area being displayed, displaying, on the display, a list including at least one item;
  determining, by the processor, a part to be displayed on the display among an entire area of all layers corresponding to the designated scrolling axis of the area being displayed by scrolling the entire area based on the designated scrolling axis for the area being displayed;
  in response to receiving an input for selecting and moving an item from among the at least one item based on the displayed list,
  moving, by the processor, the item into the determined part; and
  storing, into a memory of the device, information regarding the area including the item.

6. A user device comprising:
  a display;
  a memory;
  an input interface; and
  a processor configured to:

receive, via the input interface, a touch input based on the display, determine a display size of an area to be displayed on the display according to the touch input, control the display to display the area on the display based on the determined display size of the area, adjust the display size of the area in response to receiving a touch input based on a boundary line of the area being displayed via the input interface, after adjusting the display size of the area, control the display to display a guide screen for designating a scrolling axis of the area being displayed, in response to receiving, via the input interface, an input based on the guide screen, designate the scrolling axis including at least one of an x-axis, a y-axis, and a z-axis of the area being displayed;

after designating the scrolling axis for the area being displayed, control the display to display a list including at least one item, determine a part to be displayed on the display among an entire area of all layers corresponding to the designated scrolling axis of the area being displayed by scrolling the entire area based on the designated scrolling axis for the area being displayed, in response to receiving, via the input interface, an input for selecting and moving an item from among the at least one item based on the display list, move the item into the determined part, and store, into the memory, information regarding the area including the item.

7. The user device of claim 6, wherein the at least one item includes an icon for identifying an item.

8. The user device of claim 6, wherein the processor is further configured to, in response to maintaining a touch on at least one edge portion of at least one of the x-axis, the y-axis, and the z-axis of a scroller of the area for a predetermined amount of time, perform automatic scrolling of the area in a corresponding axis direction and change the part being displayed on the display into another part among the entire area based on the designated scrolling axis.

9. The user device of claim 6, wherein the processor is further configured to, control the display to delete area being displayed from the display as the display size of the area becomes less than a predetermined size.

10. The method of claim 1, further comprising designating, by the processor, a display size of the item within the area being displayed in response to receiving a touch input based on the area being displayed.

11. The user device of claim 6, wherein the processor is further configured to designate a display size of the item within the area being displayed in response to receiving, via the input interface, a touch input based on the area being displayed.

* * * * *